United States Patent Office 3,206,407
Patented Sept. 14, 1965

3,206,407
ORGANIC FUNCTIONAL FLUIDS AND LUBRI-
CANTS CONTAINING POLYMERIC S-TRIAZINES
Ralph Lutwack, Oakland, Calif., assignor to Shell Oil
Company, New York, N.Y., a corporation of Delaware
No Drawing. Filed Nov. 20, 1961, Ser. No. 153,757
13 Claims. (Cl. 252—78)

This invention relates to improved functional organic compositions and additives therefor. More particularly, the invention relates to oleaginous materials such as lubricants containing a novel additive.

In general functional organic fluids such as lubricants, fuels, hydraulic fluids, hydrocarbon base insecticidal compositions and the like are doped with various soluble stabilizers, e.g., alkyl phenols or aromatic amines; antiwear and extreme pressure agents such as sulfur, chlorine and/or phosphorus-containing compounds, e.g., organic phosphites, phosphates, phosphonates, sulfurized fatty materials, sulfurized oleic acid or sperm oil, chlorinated paraffin wax, etc. However, these compounds break down when used in organic liquids such as hydrocarbon oils under severe temperature and pressure conditions, and rapidly deteriorate and fail to impart their expected desired properties.

It has now been found that the effectiveness of functional organic fluids such as mineral oils is substantially improved, particularly with respect to stability and wear inhibition, by addition thereto of a minor amount (0.1–5%, preferably 1–3% by weight) of an alpha,omega polar modified oil-soluble polymeric compound obtained by polymerizing a s-triazine compound such as cyanuric chloride with an alpha,omega-polyamine or alpha,omega-polythiol under controlled conditions so as to obtain a polymer represented by the formula:

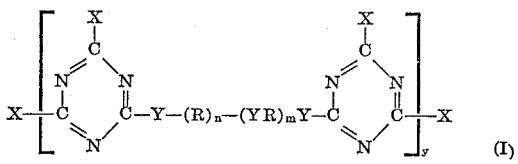

where X is a polar radical of the polar modifier selected from the group consisting of

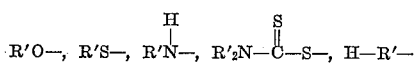

Y is nitrogen or sulfur, R a bivalent organic radical, preferably an alkylene radical of 2 to 20 carbon atoms such as ethylene, propylene, hexylene radicals or a phenylene radical, $n$ is an integer of at least 1, R' is a hydrocarbon radical such as alkyl or aryl radical and $m$ may be zero or 1, $y$ is an integer of from 1 to 20, preferably 2 to 10. A preferred class of polymers of this invention is represented by the formula:

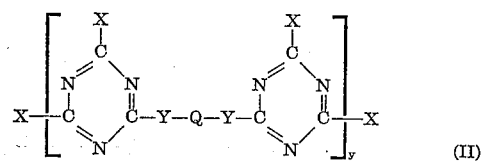

where Q is a bivalent organic radical selected from the group consisting of an arylene or an alkylene radical of from 6 to 12 carbon atoms, $y$ is an integer of from 2 to 18, preferably between 4–10, X is a residue of an alkyl mercaptan (RS—) or radical from a mono- or polyamine and Y is nitrogen or sulfur. Polymers of the present invention can vary in molecular weight from less than 1000 to over 50,000, preferably between 1000 and 5000.

The novel alpha,omega polar modified poly(N-2-s-triazinylhydrocarbylpolyamine) polymeric compounds of this invention are prepared by reaction (A) s-triazine compounds such as cyanuric chloride with suitable alpha,omega-polyamines or alpha,omega-polythiols in approximately equal molar proportions in a suitable solvent which may be polar or non-polar, at temperature ranges of from zero to about 50° C. and thereafter reacting at between 80–150° C. (90–110° C.) a polymer (A) with desired polar compounds so as to attach to the terminal carbon atom of triazinyl radicals, polar groups (X) as defined above and thereby form polymer (B) of the present invention as represented by Formulas I and II. The intermediate reaction (A) may run from 1 to 48 hours and the final reaction (B) from 1 to 15 hours. The solvent in both steps may be the same or different and include non-polar solvents such as butane, n-pentane, n-hexane, n-heptane, n-octane, isooctane, benzene, decalin or polar solvents such as acetone, acetonitrile, dimethylformamide, m-cresol or the like. The preferred solvent is acetone or n-heptane and the proportion of solvent used may vary from 1 to 20 parts per part of reactants used.

The s-triazine compounds include cyanuric chloride and derivatives thereof such as aminodichloro-s-triazines, $C_{2-18}$ alkoxydichloro-s-triazines, aroxydichloro-s-triazines, e.g., phenoxydichloro-s-triazines, $C_{6-18}$ alkyldichloro-s-triazines, and the like.

The preferred polyamines and polythiols are alpha, omega-ethylene, propylene, butylene, pentylene, hexylene, decamethylene diamines or dithiols such as alpha,omega-propanediamine, pentanediamine, hexanediamine, heptanediamine, dodecanediamine, phenylenediamine, chlorophenylenediamine, or dipropylenetriamine, triethylenetetraamine, tetraethylenepentaamine, etc. or alpha,omega-propanedithiol pentanedithiol, hexanedithiol, heptanedithiol, and mixtures thereof.

The compounds whose radical is represented by the symbol (X) in the above Formulas I and II include alkyl or aryl amines such as $C_{4-18}$ alkylamine, e.g., butylamine, hexylamine, octylamine, decylamine, dodecylamine or arylamines, e.g., aniline, naphthylamine, phenylnaphthylamine; thiols such as alkyl or aryl mercaptans, e.g., butylmercaptan, octylmercaptan, dodecylmercaptan, phenylmercaptan; dithiocarbamic acids, e.g., dibutyldithiocarbamic acid, dihexyldithiocarbamic acid, etc.

The following examples illustrate the preparation of the polymeric compounds of the present invention.

EXAMPLE A

To about 100 ml. of acetone containing 0.1 mol of cyanuric chloride was added dropwise at 0° C. 100 ml. of acetone containing 0.1 mol of alpha,omega-hexanediamine and the temperature was allowed to rise to 45–50° C. and the reaction mixture was stirred for 24 hours. To the reaction mixture aniline in 100 ml. of acetone was slowly added and the temperature increased to 90–100° C., for about 6 hours. The polymer formed was washed with 0.1 N HCl and water and dried at 60° C. The polymer recovered was alpha,omega-dianilinopoly(N-2-s-triazinylhexylenediamine), which analyzed for $C_{10.8}H_{14.3}Cl_{1.0}N_{5.0}$. The polymer was oil-soluble and exhibited good antiwear and stability properties when added in concentration of about 2% in mineral oil.

Following the above procedure other polymers of the present invention were prepared as shown in Table I.

demonstrated when to a 1010 mineral oil, 2% of additive of Example A (Composition I), or 2% of additive of Table I

| Example* | Reaction, Temp. °C. and time | S-Triazine compound | Polyamine or polythiol | Polar modifier | Reaction, temp. °C. and time | Remarks |
|---|---|---|---|---|---|---|
| B | 0–50°, 24 hrs | Cyanuric chloride | Chloro-p-phenylene diamine | Phenylenediamine | 75–80°, 5 hrs | Pink solid, anal. $C_{5.9}$, $H_{4.5}$, $Cl_{1.0}$, $N_{2.9}$. |
| C | 20–50°, 24 hrs | Cyanuric chloride | 1,4-butanedithiol | Butanethiol | 80–90°, 4 hrs | White powdery solid Anal. $C_{7.3}$, $H_{9.6}$, $S_{1.0}$, $N_{2.4}$, $O_{1.13}$. |
| D | 20–45°, 45 hrs | Cyanuric chloride | 1,5-pentanedithiol | Aniline | 80–100°, 10 hrs | White solid, Anal. $C_{15.3}$, $H_{19.4}$, $O_{1.0}$, $Cl_{3.9}$, $N_{6.4}$, $S_{4.4}$. |
| E | 20–40°, 24 hrs | N,N-butylamino-s-triazine | 1,6-hexanediamine | Laurylamine | 80–100°, 5 hrs | White solid, MW=3000. |
| F | 10–45°, 24 hrs | Phenoxy-s-triazine | 1,7-heptanediamine | Dibutyldithiocarbamic acid | 80–110°, 10 hrs | Solid, MW=3500. |
| G | 10–50°, 24 hrs | Cyanuric chloride | Tetraethylene pentamine | Stearylamine | 80–100°, 10 hrs | Solid, MW=3100. |
| H | 40–50° | Cyanuric chloride | Phenylenediamine | N-laurylpropylene diamine | 70–80°, 5 hrs | MW=2500. |
| I | 30–50° | Lauroxy-s-triazine | 1,6-hexanediamine | $C_{3-18}$ alkylphenol | 79–90°, 5 hrs | MW=2000. |
| J | 10–40° | Cyanuric chloride | 1,6-hexanedithiol | Dibutyldithiocarbamic acid | 80–100°, 10 hrs | MW=2500. |

*B, C and D solvent=acetone; E, F solvent=n-heptane; G, H solvent=m-cresol; I, J solvent=dimethylformamide.

Although the stability and wear inhibition of various functional fluids such as mineral oils or synthetic lubricants are greatly improved by addition thereto of the polymeric s-triazine containing compounds described, the oxidative stability of such compositions is greatly enhanced and the overall properties of such compositions substantially improved by addition thereto of a small amount (0.01–2% by weight, preferably 0.1–1% by weight) of a phenolic antioxidant compound such as mono or bisphenols, preferably phenols which contain at least one tertiary alkyl radical. Alkyl phenols of this type include 2,4,6-triethyl-, tributyl-, trioctyl-, 2,4-ditert-butyl-6-methyl-, 2,6-ditert-butyl-4-methyl-, 2,4,6-tritert-butyl-, 2,6-dicyclohexyl-4-methyl-, 2,6-dimethyl-4-cyclohexylphenols, 2,6-ditertbutyl, 2,2-ditertbutyl, 2,6-tertbutyl-cyclohexyl, 2-methyl-6-tertbutyl-4-methylphenols. The alkyl bisphenols include 1,1-bis(2-hydroxy-3-t-butyl-5-methylphenyl)methane;
bis(2-hydroxy-3-t-butyl-5-methylphenyl)ethane;
1,1-bis(2-hydroxy-3-t-butyl-5-methylphenyl)propane;
bis(2-hydroxy-3-t-butyl-5-methylphenyl)butane;
bis(3-hydroxy-3-t-butyl-5-methylphenyl)isobutane;
1,1-bis(6-hydroxy-5-t-butyl-3-methylphenyl)methane;
bis(2-hydroxy-5-t-butyl-3-methylphenyl)ethane;
1,1-bis(2-hydroxy-5-t-butyl-3-methylphenyl)propane;
1,1-bis(2-hydroxy-5-t-amyl-3-methylphenyl)butane;
1,1-bis(2-hydroxy-5-t-amyl-3-methylphenyl)isobutane;

etc. The 2,4,6-trialkyl phenols containing two tertiary alkyl groups in the 2,4- or 2,6-positions are preferred, such as 2,4-ditert-butyl-6-methyl-, 2,6-ditert-butyl-4-methylphenol or 2,6-ditert-butyl-4-methylolphenol or 4,4'-methylene bis(2,6-dibutylphenol).

The addition of the polymeric s-triazine containing compounds of this invention alone or in combination with a phenolic compound effectively stabilizes and improves various materials as oleaginous materials, polymers, fuels, waxes, resins and particularly liquid hydrocarbons such as gasoline, jet fuels, transformer oils, turbine oils, mineral lubricating oils, and industrial oils such as cutting fluids, quenching fluids, etc. The additives of this invention are particularly useful in highly refined mineral oils of the lubricating oil viscosity range (SAE 10W–SAE 90) from which natural occurring oxidation inhibitors have been removed by refining. Additionally, synthetic hydrocarbon oils and resins such as olefin polymers, e.g., ethylene/propylene, isobutylene/octadecene, isobutylene/styrene copolymers, etc., as well as synthetic oils of the ester type, e.g., di-2-ethylhexylsebacate, etc., are improved by the additive or additive combination of this invention.

The pronounced and unexpected results obtained by use of the polymeric compounds of the invention are Example B (Composition II), or 2% of additive of Example A and 0.3% of 2,6-ditert-butyl-4-methylphenol (Composition III) or 2% of additive of Example C and 0.2% of 2,6-ditert-butyl-4-methylolphenol (Composition IV), or 3% of additive of Example A and 0.1% of 4,4'-methylene bis(2,6-ditert-butylphenol) (Composition V), showed a wear resistance and oxidation stability of 4 to 19 times that of the 1010 neat mineral oil or the same oil containing 2% of an E.P. addition, e.g., decyl-mercaptothiomethylphosphonic acid (Composition X). The wear resistance was determined by the iron powder adsorption test (Transaction of the Faraday Society, vol. 45, 1949, pages 623–635) and the oxidation stability was determined by the Dornte Oxidation Test (National Petroleum News, September 17, 1941, pages R294–6).

Compositions of this invention are useful for providing stability and other desired properties to petroleum products such as mineral lubricating oils which also contain small amounts (0.1% to 3%) of their agents such as metal detergents such as metal organic sulfonates, e.g. neutral or basic Ca, Ba or Zn petroleum sulfonates; anti-wear agents such as metal thiocarbamates, e.g., Zn, Cr, or Ca dibutyl or diamyl dithiocarbamate; viscosity-index improvers, pour point depressants and non-ash forming detergents such as the oil-soluble nitrogen-free polymethacrylates available under the name "Acryloids" and, specifically, "Acryloid" 150, 618, 710, 768, described in U.S. Patent 2,710,842; extreme pressure agents such as organic sulfides, e.g., dibenzyl disulfide and mixtures thereof.

I claim as my invention:

1. An organic functional fluid consisting essentially of a major amount of a liquid hydrocarbon and from about 0.1% to about 5% of an oil-soluble polymeric derivative of s-triazine having the formula

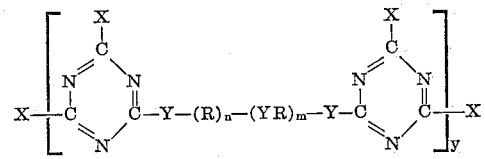

where X is a polar-containing radical selected from the group consisting of

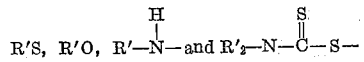

where R' is a hydrocarbyl radical selected from the group consisting of alkyl and aryl radicals, Y is selected from the group consisting of sulfur and nitrogen, R is a bivalent organic radical selected from the group consisting of $C_{2-20}$ alkylene and phenylene radicals, $n$ is 1, $m$ is an integer varying from zero to 1, y is an integer of from 1 to 20, said polymer having a molecular weight of from about 1000 to about 50,000.

2. A mineral oil composition consisting essentially of a major amount of mineral oil and from 0.1% to about 5% of an oil-soluble polymeric derivative of s-triazine having the formula:

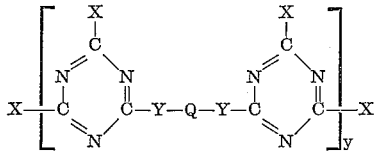

where X is a polar radical selected from the group consisting of

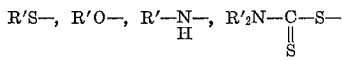

where R' is a hydrocarbyl radical selected from the group consisting of alkyl and aryl radicals, Y is selected from the group consisting of nitrogen and sulfur, Q is an alkylene radical of 6 to 12 carbon atoms, y is an integer of from 2 to 10, having a molecular weight of from about 1000 to about 50,000.

3. A mineral oil composition consisting essentially of a major amount of mineral oil and from 0.1% to 5% of an oil-soluble alpha,omega-poly(N-2-s-triazinylalkenepolyamine) having a molecular weight of from about 1000 to about 5000.

4. A mineral oil composition consisting essentially of a major amount of mineral oil and from 0.1% to 5% of an oil-soluble alpha,omega-mercaptopoly(N-2-s-triazinylalkenepolyamine) having a molecular weight of from about 1000 to about 5000.

5. A mineral oil composition consisting essentially of a major amount of mineral oil and from about 0.1% to about 5% of an oil-soluble alpha,omega-aminopoly(N-2-s-triazinylalkenediamine) having a molecular weight of from 1000 to 5000.

6. A mineral oil composition consisting essentially of a major amount of mineral oil and from 0.1% to about 5% of an oil-soluble alpha,omega-mercaptopoly(N-2-s-triazinylalkenediamine) having a molecular weight of from 1000 to 5000.

7. A mineral oil composition consisting essentially of a major amount of mineral oil and from 0.1% to about 5% of an oil-soluble alpha,omega-anilinopoly(N-2-s-triazinylhexylenediamine) having a molecular weight of from 1000 to 5000.

8. A mineral oil composition consisting essentially of a major amount of mineral oil and from about 0.1% to about 5% of an oil-soluble alpha,omega-mercaptopoly(N-2-s-triazinylhexylenediamine) having a molecular weight from from 1000 to 5000.

9. A mineral oil composition consisting essentially of a major amount of mineral oil and from about 0.1% to about 5% of an oil-soluble alpha,omega-dithiocarbamyl-(N-2-s-triazinylhexylenediamine) having a molecular weight of from 1000 to 5000.

10. A mineral oil composition consisting essentially of a major amount of mineral oil and from about 0.1% to about 5% of an oil-soluble alpha,omega-phenoxy(N-2-s-triazinylhexylenediamine) having a molecular weight of from 1000 to 5000.

11. A mineral oil composition consisting essentially of a major amount of mineral oil and from about 0.1% to about 5% of an oil-soluble alpha,omega-anilinopoly(N-2-s-triazinylhexylenediamine) having a molecular weight of from 1000 to 5000 and from about 0.01% to about 2% of an oil-soluble phenolic compound selected from the group consisting of trialkyl phenol and bis(di-tert-alkylhydroxyphenyl)alkane.

12. A mineral oil composition consisting essentially of a major amount of mineral oil and from about 0.1% to about 5% of an oil-soluble alpha,omega-anilinopoly(N-2-a major amount of mineral oil and from about 0.1% to from 1000 to 5000 and from about 0.01% to about 2% of 2,6-ditert-butyl-4-methylphenol.

13. A mineral oil composition consisting essentially of a major amount of mineral oil and from about 0.1% to about 5% of an oil-soluble alpha,omega-anilinopoly(N-2-s-triazinylhexylenediamine) having a molecular weight of from 1000 to 5000 and from about 0.01% to about 2% of bis(3,5-ditert-butyl-4-hydroxyphenyl)methane.

References Cited by the Examiner
UNITED STATES PATENTS

| | | | |
|---|---|---|---|
| 2,202,828 | 6/40 | Bruson | 260—249.5 |
| 2,676,150 | 4/54 | Loughran et al. | 252—47 |
| 2,676,151 | 4/54 | Loughran et al. | 252—47 |
| 2,820,032 | 1/58 | Hill et al. | 260—249.5 |
| 2,830,052 | 4/58 | Birtwell et al. | 26—249.5 |
| 2,855,366 | 10/58 | Manteuffel et al. | 252—78 |
| 2,913,415 | 11/59 | Schmitz | 252—78 |
| 2,984,624 | 5/61 | Halter et al. | 252—47 XR |
| 3,038,900 | 6/62 | Dess | 252—78 XR |

JULIUS GREENWALD, *Primary Examiner.*
ALBERT T. MEYERS, *Examiner.*